(12) United States Patent
Kahle et al.

(10) Patent No.: US 9,064,030 B2
(45) Date of Patent: Jun. 23, 2015

(54) TREE TRAVERSAL IN A MEMORY DEVICE

(71) Applicant: International Business Machines Corporation, Armonk, NY (US)

(72) Inventors: James A. Kahle, Austin, TX (US); Jaime H. Moreno, Dobbs Ferry, NY (US); Ravi Nair, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 13/688,530

(22) Filed: Nov. 29, 2012

(65) Prior Publication Data

US 2014/0149464 A1 May 29, 2014

(51) Int. Cl.
*G06F 17/30* (2006.01)

(52) U.S. Cl.
CPC .... *G06F 17/30961* (2013.01); *G06F 17/30327* (2013.01); *G06F 17/30362* (2013.01)

(58) Field of Classification Search
CPC .................... G06F 17/30327; G06F 17/30362; G06F 17/30961
USPC .................................................. 707/769, 797
See application file for complete search history.

(56) References Cited

U.S. PATENT DOCUMENTS

| | | | | |
|---|---|---|---|---|
| 4,914,569 A * | 4/1990 | Levine et al. | | 1/1 |
| 6,484,172 B1 * | 11/2002 | Lee et al. | | 1/1 |
| 6,697,851 B1 * | 2/2004 | Althaus et al. | | 709/220 |
| 6,751,622 B1 * | 6/2004 | Puri et al. | | 1/1 |
| 6,772,179 B2 * | 8/2004 | Chen et al. | | 1/1 |
| 7,403,941 B2 * | 7/2008 | Bedworth et al. | | 1/1 |
| 7,917,723 B2 | 3/2011 | Wooten | | |
| 7,930,311 B2 * | 4/2011 | Feng et al. | | 707/758 |
| 8,065,293 B2 * | 11/2011 | Mukerjee et al. | | 707/711 |
| 8,069,311 B2 * | 11/2011 | Sun | | 711/137 |
| 2005/0102294 A1 * | 5/2005 | Coldewey | | 707/100 |
| 2006/0004721 A1 * | 1/2006 | Bedworth et al. | | 707/3 |
| 2006/0149766 A1 * | 7/2006 | Ghoting et al. | | 707/101 |
| 2008/0065661 A1 * | 3/2008 | Mazzagatti et al. | | 707/100 |
| 2008/0134174 A1 | 6/2008 | Sheu et al. | | |
| 2009/0077076 A1 * | 3/2009 | Berger et al. | | 707/6 |
| 2009/0112905 A1 * | 4/2009 | Mukerjee et al. | | 707/102 |
| 2009/0172010 A1 * | 7/2009 | Feng et al. | | 707/102 |
| 2010/0153880 A1 * | 6/2010 | Dinn | | 715/816 |
| 2011/0131389 A1 | 6/2011 | Gremaud et al. | | |
| 2011/0173363 A1 | 7/2011 | Conti et al. | | |
| 2012/0197929 A1 * | 8/2012 | Williams | | 707/769 |
| 2012/0254496 A1 * | 10/2012 | Dedeoglu | | 711/1 |

FOREIGN PATENT DOCUMENTS

JP 2006178764 A 7/2006
WO WO2011103184 A2 8/2011

OTHER PUBLICATIONS

A. Arcangeli, et al., "Increasing memory density by using KSM," 2009 Linux Symposium, 12 pages.

* cited by examiner

*Primary Examiner* — Jean M Corrielus
(74) *Attorney, Agent, or Firm* — Cantor Colburn LLP (57) ABSTRACT

Embodiments relate to tree traversal in a memory device. An aspect includes a method for tree traversal in a memory device. The method includes receiving a pointer to a tree structure within memory of the memory device. An evaluation condition is received to identify a desired node of the tree structure. The tree structure is traversed to identify the desired node. Data is returned from the desired node meeting the evaluation condition.

17 Claims, 5 Drawing Sheets

TREE TRAVERSAL IN A MEMORY DEVICE

BACKGROUND

The present invention relates generally to computer memory, and more particularly to tree traversal in a memory device.

Computer systems often require a considerable amount of high speed memory, such as random access memory (RAM), to hold information, such as data and programs, when a computer is powered and operational. Memory device demands have continued to grow as computer systems have increased in performance and complexity.

Some computer programs access large volumes of data, where the data itself may be organized in complex and dynamic data structures. Searching for data organized in complex data structures can be an intensive task for processing and memory systems. For example, a processing system that includes a cache memory system may experience a number of cache updates when searching a tree data structure that is widely distributed across a number of non-contiguous memory locations. Latency involved in numerous memory system accesses as well as evaluating numerous data values retrieved from the memory system can result in extended search times and reduced processing system throughput.

SUMMARY

Exemplary embodiments include a method for tree traversal in a memory device. The method includes receiving a pointer to a tree structure within memory of the memory device. An evaluation condition is received to identify a desired node of the tree structure. The tree structure is traversed to identify the desired node. Data is returned from the desired node meeting the evaluation condition.

Additional exemplary embodiments include a memory device including memory and a tree traverser. The tree traverser includes a traverse engine within the memory device. The traverse engine is configured to perform a method. The method includes receiving a pointer to a tree structure within the memory of the memory device. An evaluation condition is received to identify a desired node of the tree structure. The tree structure is traversed to identify the desired node by a traverse engine within the memory device. Data is returned from the desired node meeting the evaluation condition.

Further exemplary embodiments include a system for memory device tree traversal. The system includes a processor and a memory device. The memory device includes memory and a tree traverser. The tree traverser includes a traverse engine within the memory device. The traverse engine is configured to perform a method. The method includes receiving a pointer to a tree structure within the memory from the processor. An evaluation condition is received to identify a desired node of the tree structure from the processor. The tree structure is traversed to identify the desired node. Data is returned to the processor from the desired node meeting the evaluation condition.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

An embodiment is directed to tree traversal of a tree structure in a memory device. Tree traversal logic can be implemented within an active memory device or a hybrid memory device. The active memory device may be any suitable memory device including a plurality of memory elements (e.g., chips) connected to a logic portion and a processing element. In an embodiment, the active memory device includes layers of memory that form a three dimensional ("3D") memory device (e.g., a memory cube) where individual columns of chips form vaults in communication with the processing element and logic. The active memory device may include a plurality of processing elements configured to communicate to the chips and other processing elements. In an embodiment, a processing element accesses a selected address in a vault through an interconnect network. In addition, the interconnect network provides a communication path between processing elements and vaults on the active memory device as well as between processing elements and a main processor. Each vault may have an associated memory controller or logic unit that is also coupled to the interconnect network.

A hybrid memory device can also be a memory cube with memory vaults and a memory controller but excludes the processing elements of the active memory device. Both the active and hybrid memory device can include a tree traverser with traverse engines for localized tree structure searching. Embodiments as further detailed herein are described in terms of an active memory device; however, it will be understood that a hybrid memory device can be substituted for the active memory device, where tree related operations are managed by a tree traverser of the hybrid memory device.

Embodiments include an active memory device that can perform a complex set of operations using multiple locations (e.g., data stored at specific addresses) within the active memory device as operands. Further, a process is provided whereby the instructions and operations are performed autonomously on these operands within the active memory device. Specifically, the instructions are stored within the active memory device itself and are not executed by a main processor. The stored instructions are provided to the processing elements for processing by the processing element in the active memory device. In one embodiment, the processing elements are programmable engines, including an instruction buffer, an instruction unit with branching capability and instruction decode, a mixture of vector, scalar, and mask register files, a plurality of load/store units for the movement of data between memory and the register files, and a plurality of execution units for the arithmetic and logical processing of various data types. Processing elements can also serve as tree traversers and include traverse engines. Also included in the active memory device are address translation capabilities for converting virtual (i.e., effective) addresses to real (i.e., physical) addresses, a unified Load/Store Queue to sequence data movement between the memory and the processing elements, and a processor communications unit, for communication with the main processor.

In an embodiment, the active memory device is configured to load configuration information or instructions from a part of the active memory device into a processing element following receiving a command from an external requestor, such as a main processor or another processing element. In addition, the processing element may perform virtual-to-real (i.e., effective-to-physical) address translations that are computed while executing the loaded instructions. In an example, when performing a load instruction, the active memory device accesses an operand from a memory location and places the operand in a register in the processing element. A virtual address of the memory location is generated by the load instruction and is translated into a real address by the processing element. Similarly, when performing a store instruction, the active memory device writes a memory location with the contents (e.g., an operand) in a register in the processing element. A virtual address of the memory location is generated by the store instruction and is translated into a real address by the processing element.

Embodiments of the processing element in the active memory device also have the ability to read or to write operands in any part of the active memory device through the interconnect network. Specifically, a processing element may access other vaults in the active memory device using the interconnect network. In an embodiment, processing elements are pooled and coupled to the vaults via the interconnect network, where the processing elements are not physically located in the vault stack. In an embodiment, the interconnect network is a coupling device, such as a crossbar switch, configured to connect any processing element to any memory vault, provided the processing element and memory vault are coupled to the interconnect. In an embodiment, the interconnect network may couple a plurality of active memory devices, where the interconnect network provides a communication path between processing elements and memory vaults of separate devices.

In one embodiment, the processing element is included with the memory controller as part of the stack. In addition, the processing element may perform complex arithmetic and logic operations on the operands, and read and write end results back to locations in memory. The active memory device may return a single result value or signal to the main processor indicating that the results of the desired complex operation are ready in the active memory device, thus performing the high bandwidth processing on the active memory device and using a lower bandwidth communication between the active memory device and main processor.

The processing capabilities within an active memory device may reduce memory latency and energy consumption that would otherwise be experienced when memory is accessed by a processor residing in a separate chip. Instead of bringing data from memory to the separate processing chip through lower bandwidth communication paths, performing what is often quite simple calculations on the data, and then transferring the processed data back to memory, the main processor can configure the processing elements within the active memory device, and then instruct them to carry out the data processing tasks. This may be achieved by sending one or more commands from the main processor to the active memory device. In this scenario, the movement of data between the location where the data processing is performed and memory is greatly reduced, both in the distance it has to travel from the memory to the data processing location, and in the number of levels of cache traversed through a memory hierarchy.

Figure 1:
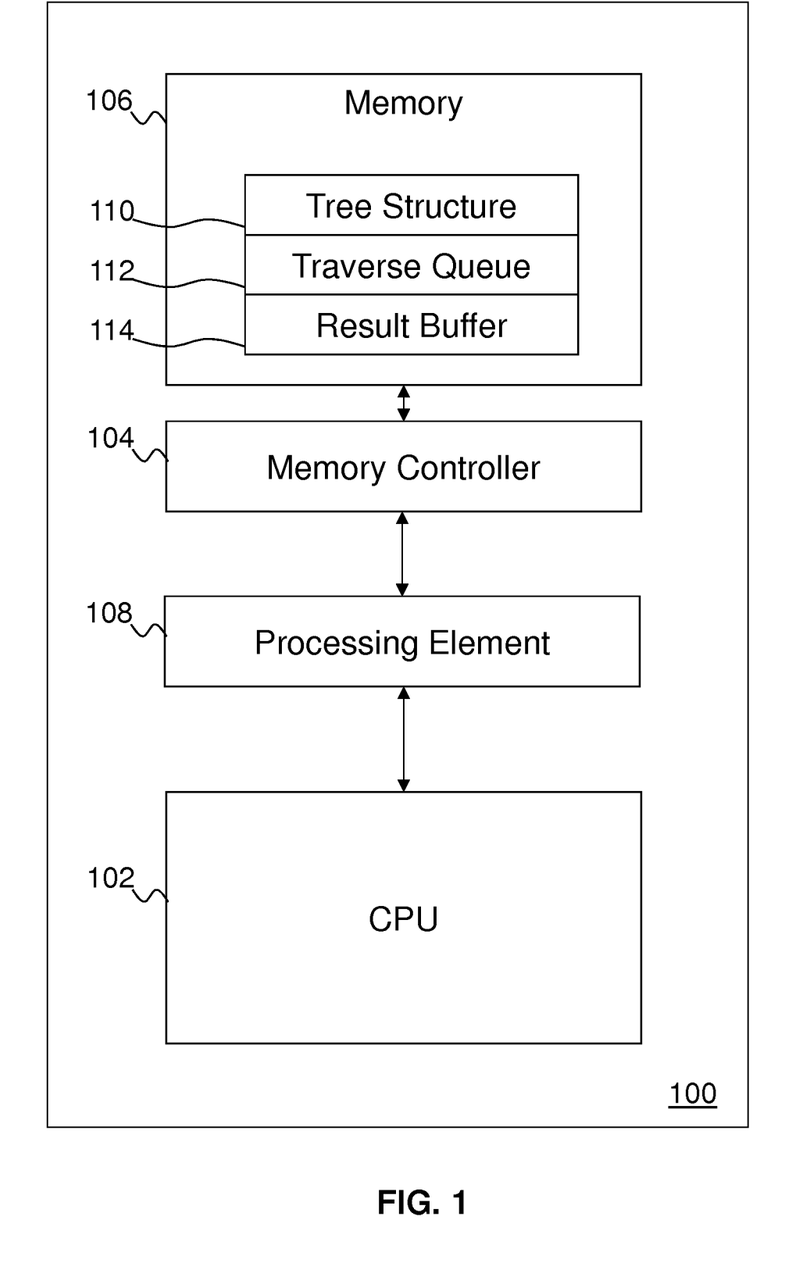
FIG. 1 illustrates a block diagram of a system supporting in memory tree traversal in accordance with an embodiment.

FIG. 1 illustrates a block diagram of a system for storing, searching, and retrieving data in memory and supporting tree traversal in accordance with an embodiment. A system 100 depicted in FIG. 1 includes a computer processor (CPU) 102, a memory 106 having memory elements, as well as a memory controller 104 and processing element 108 for receiving and processing data from the computer processor 102 to be stored in the memory 106. The memory 106 can include a tree structure 110, a traverse queue 112, and a result buffer 114.

The memory controller 104 may be in communication with the computer processor 102 and receive write requests from the computer processor 102 without using functions of the processing element 108. The write requests contain data to be written to the memory 106 and a real address for identifying the location in the memory 106 to which the data will be written. The memory controller 104 stores data at a real address within the memory 106. The computer processor 102 can map the virtual address to a real address in the memory 106 when storing or retrieving data.

In an embodiment, the processing element 108 is in communication with the computer processor 102 and receives a command from the computer processor 102. The command may correspond to instructions stored in the memory 106. The command may also include a virtual address for identifying the location in the memory 106 to access. The memory controller 104 and/or processing element 108 accesses data at a real address within the memory 106. In an embodiment, the processing element 108 maps the virtual address to a real address in the memory 106 when storing or retrieving data. As described in further detail below, the computer processor 102 provides commands to the memory 106, where the processing element 108 receives the command and fetches corresponding instructions from the memory 106. To enhance throughput for complex data structures, the computer processor 102 can create the tree structure 110 in the memory 106, such as a binary tree, and utilize the processing capabilities of the processing element 108 to perform look-up or searching operations on the tree structure 110. The processing element 108 may receive a pointer to the tree structure 110 from the computer processor 102 and evaluation conditions for locating data in one or more desired nodes of the tree structure 110. The processing element 108 uses the traverse queue 112 for temporary storage when performing searches, such as recursive searches. The processing element 108 writes the data or evaluation results to the result buffer 114. The computer processor 102 can receive results directly from the processing element 108 or access the result buffer 114 to obtain the results.

The system 100 is one example of a configuration that may be utilized to perform the processing described herein. Although the system 100 has been depicted with only a single memory 106, memory controller 104, processing element 108 and computer processor 102, it will be understood that other embodiments would also operate in other systems with two or more of the memory 106, memory controller 104, processing element 108 or computer processor 102. In an embodiment, the memory 106, memory controller 104, processing element 108 and computer processor 102 are not located within the same computer. For example, the memory 106, processing element 108 and memory controller 104 may be located in one physical location (e.g., on a memory module) while the computer processor 102 is located in another physical location (e.g., the computer processor 102 accesses the memory controller 104 and/or processing element 108 via a network). In addition, portions of the processing described herein may span one or more of the memory 106, memory controller 104, processing element 108 and computer processor 102. The tree structure 110, traverse queue 112, and result buffer 114 can be distributed within the memory 106.

Figure 2:
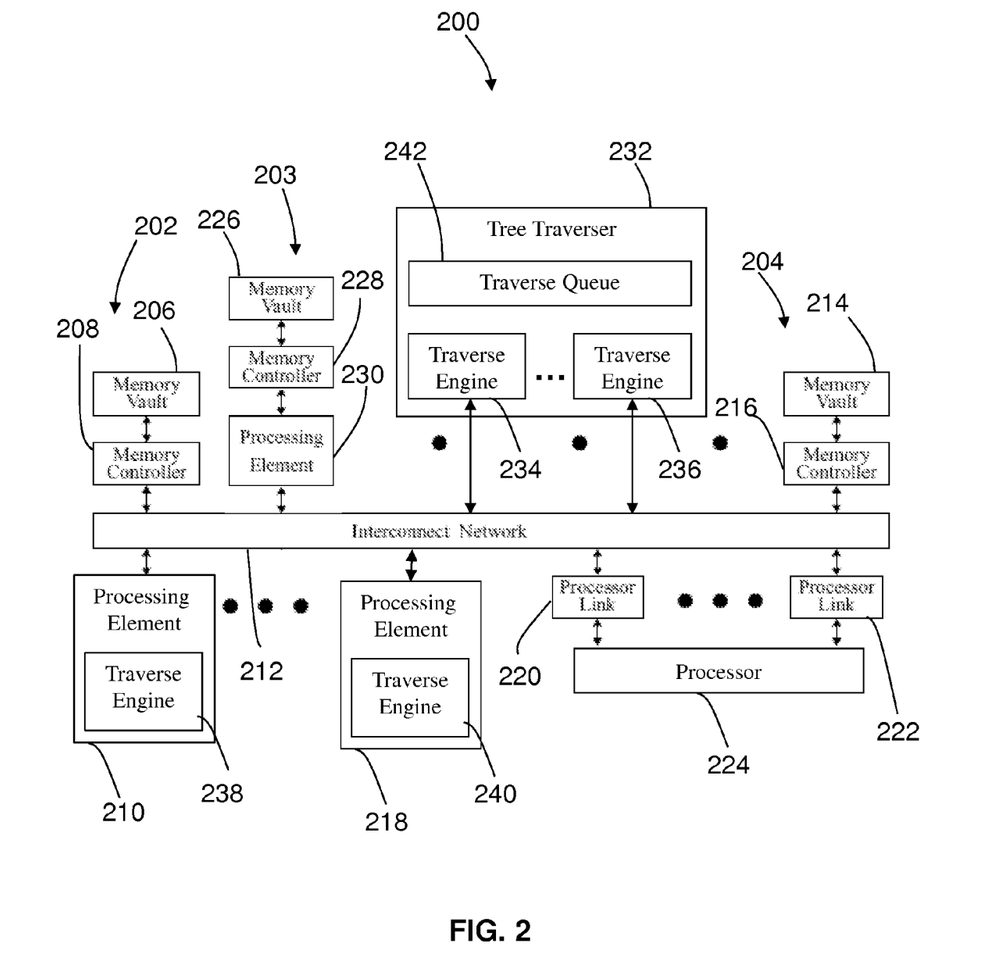
FIG. 2 illustrates a block diagram of a memory system with traverse engines in accordance with an embodiment.

FIG. 2 is a schematic diagram of an embodiment of a computer system 200 implementing memory with traverse engines. In one embodiment, the computer system 200 includes an active memory device 202, an active memory device 203 and an active memory device 204. The active memory device 202 includes a memory vault 206, a memory controller 208 and a processing element 210. In an embodiment, the processing element 210, memory vault 206 and memory controller 208 are coupled and communicate via an interconnect network 212. Specifically, the processing element 210 communicates to the memory vault 206, memory controller 208 and other memory devices, such as active memory devices 203 and 204, via the interconnect network 212. The interconnect network 212 is also coupled to a main processor 224 by processor links 220 and 222. The interconnect network 212 provides a fast and high bandwidth path for communication between portions of the device, such as processing elements, memory controllers and memory, to provide improved performance and reduced latency for the active memory.

The active memory device 203 includes a memory vault 226, a memory controller 228 and a processing element 230. In an embodiment, the processing element 230, memory vault 226 and memory controller 228 are all located on the same side of the interconnect network 212, such as within a single stack. By positioning the processing element 230 in the same stack as memory vault 226, the latency is reduced when accessing locations in the memory vault 226, thus further improving performance. In one embodiment, the active memory 204 includes a memory vault 214 and memory controller 216 coupled to processing element 210 and processing element 218 via the interconnect network 212. As depicted, the processing element 218 is located on the other side of the interconnect network 212 from the memory controller 216 and memory vault 214. In embodiments, the active memory devices 202, 203 and 204 include multiple layers of stacked addressable memory elements. Further, the stacks memory may be divided into memory vaults 206, 226 and 214, or three-dimensional blocked regions of the memory device which share a common memory controller and/or memory element, and are capable of servicing memory access requests to their domain of memory independently of one another.

In embodiments, the processing elements, memory vaults and memory controllers may be arranged in a suitable manner depending on the application. For example, one or more processing elements, such as processing element 218, may be positioned on one side of the interconnect network 212 and may operate as a pool of processing elements that are available for accessing any memory in the memory system coupled to the interconnect network 212. The pooled processing elements are not limited to accessing a particular memory vault and, thus, one or more elements may be utilized upon receiving a command from the main processor 224. Accordingly, processing element 218 may be configured to access each memory vault 206, 214 and 226. In another embodiment, one or more processing element, such as processing element 230, is located as part of a stack including a memory vault 226 and memory controller 228. In such a configuration, the processing element 230 is configured to access memory vault 226 without going through the interconnect network 212. The processing element 230 is also coupled to the interconnect network 212 and can access memory vaults 206 and 214. In one embodiment, one or more processing element, such as processing element 210, is positioned on an opposite side of the interconnect network 212 from the memory vault 206 and memory controller 208. In the configuration, the processing element 210 is configured to access any memory coupled to the interconnect network 212, including memory vaults 214 and 226.

The computer system 200 of FIG. 2 can also include a tree traverser 232. The tree traverser 232 may include one or more traverse engines, such as traverse engines 234-236. Traverse engines can also or alternatively be incorporated within one or more processing elements, such as traverse engine 238 of processing element 210 and traverse engine 240 of processing element 218. The traverse engines 234-240 are coupled to the interconnect network 212 and are configured to access one or more of the memory vaults 206, 214, and 226 to locate nodes of the tree structure 110 of FIG. 1 and extract associated data. The traverse engines 234-240 can also communicate with one or more traverse queues, such as traverse queue 112 of FIG. 1 and/or traverse queue 242. The tree traverser 232 and/or traverse engines 234-240 can write results of tree traversal to the result buffer 114 of FIG. 1 and provide a pointer or notification of completion to the main processor 224 or computer processor 100 of FIG. 1. The tree traverser 232 can be implemented in dedicated hardware, such as one or more tree traverser circuits per active memory device. Alternatively, a processing element, such as processing element 218, is configured as a tree traverser to manage traverse engine 240. Separate instances of the tree traverser 232 can be located within each active memory device 202-204.

In an embodiment, the computer system may include a plurality of active memory devices, such as the active memory devices 202, 203 and 204. Further, each active memory device may include a plurality of stacks, each stack including a memory vault, memory controller and associated processing element. In one example, the number of processing elements may be greater than the number of memory vaults. In another embodiment, the memory devices may include fewer processing elements than memory vaults. In embodiments, the processing elements are pooled and available to access any memory in the system. For example, a memory device may include 16 memory vaults and memory controllers, but only eight processing elements. The eight processing elements are pooled, and utilized as resources for accessing any memory vaults coupled to the interconnect network. In another example, a memory device may be passive, where the device is controlled by processing elements of active memory devices coupled to the interconnect network.

Alternatively, the computer system 200 can be implemented using hybrid memory devices, where processing elements are not incorporated into memory devices. Tree traversal can be included within a hybrid memory device by incorporating one or more tree traverser 232 to internally manage tree searching in the hybrid memory device.

Figure 3:
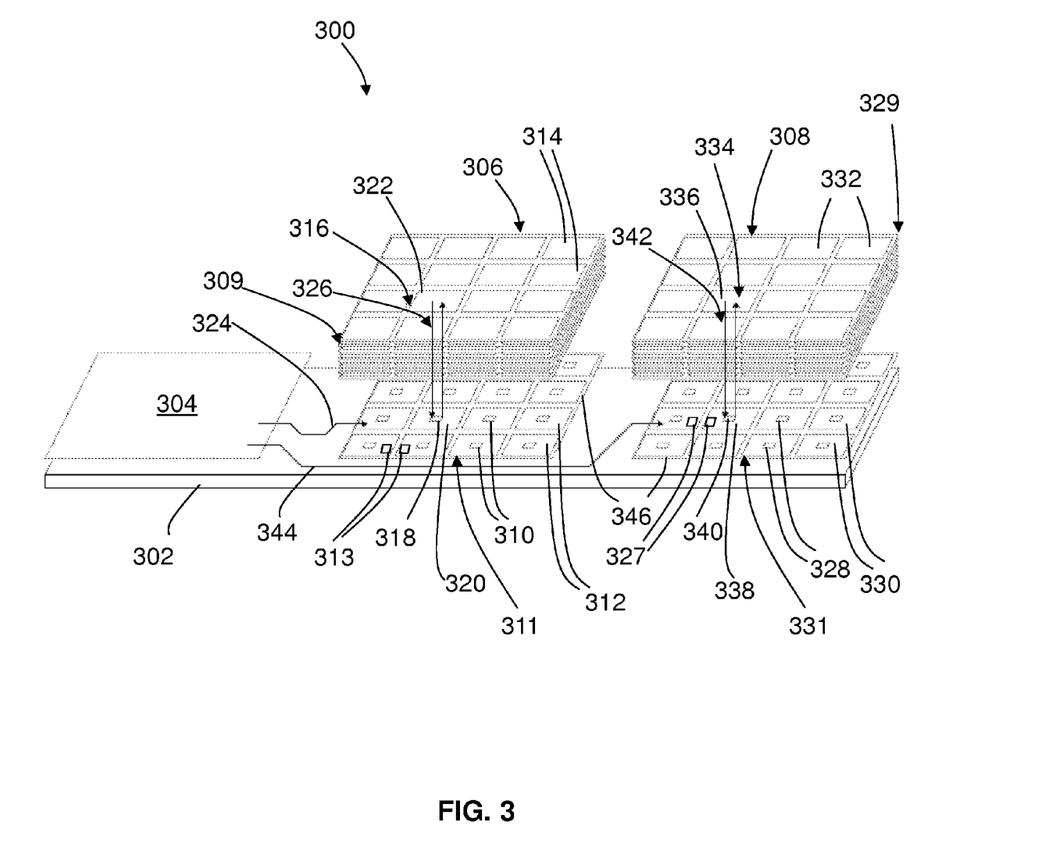
FIG. 3 illustrates a schematic diagram of a memory system with traverse engines in accordance with an embodiment.

FIG. 3 is a diagram of an exemplary computer system 300 implementing memory with traverse engines. The computer system 300 includes a circuit board 302, a main processor 304, active memory device 306 and active memory device 308. The active memory device 306, active memory device 308 and main processor 304 are disposed on the circuit board 302. As depicted, portions of the active memory devices 306 and 308 are exploded to show details of the computer system 300 arrangement. The active memory devices 306 and 308 communicate to the main processor 304 via signal paths 324 and 344, respectively. As depicted, the active memory 306 device is arranged in layers, where a base layer 311 includes a plurality of memory controllers 310, processing elements 312, and traverse engines 313. For example, the active memory device 306 includes layers 309 of memory placed on top of the base layer 311, where the layers 309 each have a plurality of memory elements. As depicted, the base layer 311 also includes an interconnect network 346 to enable high bandwidth communication between memory, memory controllers, processing elements, and traverse engines in the device. While only two traverse engines 313 are depicted in FIG. 3, any number of traverse engines 313 can be distributed in the active memory 306 within the processing elements 312 or a dedicated tree traverser (not depicted).

In an embodiment, the active memory device 306 includes a plurality of memory vaults 314, where each memory vault 314 includes a memory element from each layer 309, the memory vaults 314 positioned adjacent to memory controllers 310 and processing elements 312. Specifically, the exemplary active memory device 306 includes layers of 16 memory elements, where the element layers form stacks, including a stack 316, where the stack 316 includes a memory vault 322 disposed above a memory controller 318 and a processing element 320. A high bandwidth communication path 326 provides a high bandwidth, direct and substantially reduced length (e.g., as compared to paths 324, 344) communication path between the processing element 320 and memory locations within the memory vault 322, thus reducing latency and power consumption for memory accesses. For example, the processing element 320 may receive a command from the main processor 304, load instructions from within the active memory device 306 based on the command, and, as part of the loaded instructions, access data at a location in the memory vault 314 and perform a complex operation on the data in the processing element 320, such as evaluating and traversing tree nodes of tree structure 110 of FIG. 1 using traverse engine 313. Further, the processing element 320 may also store data in result buffer 114 (FIG. 1) of the memory vault 314 and transmit a value or signal to the main processor 304 following execution of the command. In an embodiment, the processing element 320 stores or writes data (e.g., tree traversal results) from a register in the processing element 320 to the memory vault 314. The processing element 320 is also configured to translate addresses from virtual-to-real and real-to-virtual as part of the read or store operations. Thus, the processing element 320 provides instruction loading, address translation, tree traversal and other tasks local to the memory to reduce latency, save power and free up the main processor 304 to perform other tasks.

Similarly, the active memory device 308 includes a plurality of traverse engines 327, memory controllers 328 and processing elements 330 disposed on a base layer 331. In an embodiment, the active memory 308 includes layers 329 of memory elements placed on top of the base layer 331, where the layers 329 each have a plurality of memory elements. The base layer 331 also includes an interconnect network 346 to enable high bandwidth communication between memory and processing elements in the device. In an embodiment, the interconnect networks 346 of active memory device 306 and active memory device 308 are coupled and allow communication between processing elements and memory on separate devices. While only two traverse engines 327 are depicted in FIG. 3, any number of traverse engines 327 can be distributed in the active memory 308 within the processing elements 330 or a dedicated tree traverser (not depicted).

In an embodiment, the active memory device 308 includes a plurality of memory vaults 332, where each memory vault 332 includes a memory element from each layer 309, the memory vaults 332 are positioned adjacent to memory controllers 328 and processing elements 330. The exemplary active memory device 308 includes 16 stacks, including stack 334, where the stack 334 includes a memory vault 336 disposed above a memory controller 340 and a processing element 338. A high bandwidth communication path 342 provides communication between the processing element 330 and memory locations within the memory vault 336.

Each active memory device 306 and 308 can include a separate tree structure 110, traverse queue 112, and result buffer 114 of FIG. 1. The traverse engines 313 of active memory device 306 can operate collaboratively in traversing an instance of the tree structure 110 that is local to the active memory device 306. Similarly, traverse engines 327 of active memory device 308 can operate collaboratively in traversing an instance of the tree structure 110 that is local to the active memory device 308. This enables the main processor 304 to initiate multiple tree traversals in parallel in different memory devices without a large volume of bus traffic or processor cache updates for each tree traversal operation.

Figure 4:
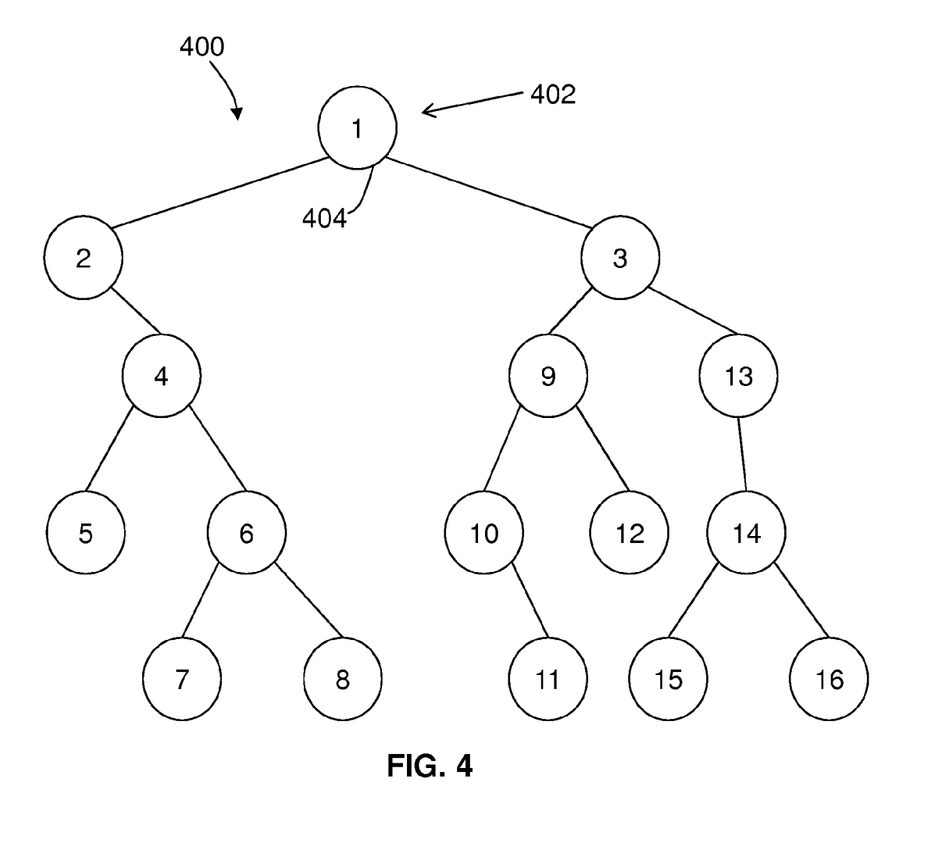
FIG. 4 illustrates an example of a tree structure in accordance with an embodiment.

FIG. 4 depicts an example of a tree structure 400 in accordance with an embodiment. A tree root pointer 402 points to a root node 404 of the tree structure 400. A main processor, such as main processor 224 of FIG. 2, can create the tree structure 400 in a memory device and pass the tree root pointer 402 to a tree traverser, such as tree traverser 232 of FIG. 2, for traversal and evaluation. In the example of FIG. 4, the root node 404 has a data value of one and is therefore also referred to as node 1. As can be seen in FIG. 4, node 1 has two child nodes, node 2 and node 3. Node 2 has one child node, node 4. Node 4 has two child nodes, node 5 and node 6. Node 6 has two child nodes, node 7 and node 8. Node 3 has two child nodes, node 9 and node 13. Node 9 has two child nodes, node 10 and node 12. Node 10 has one child node, node 11. Node 13 has one child node, node 14. Node 14 has two child nodes, node 15 and node 16.

Figure 5:
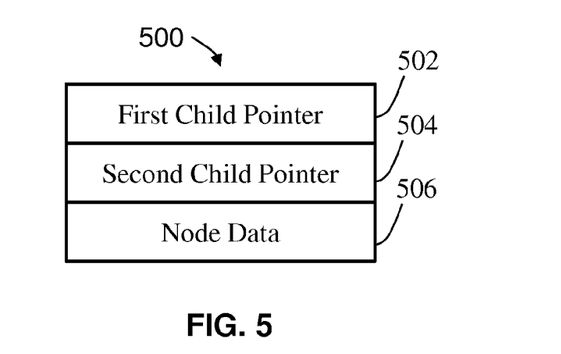
FIG. 5 illustrates an example data structure for a node of a tree structure in accordance with an embodiment.

The nodes of the tree structure 400 can be represented in memory according to data structure 500 of FIG. 5, where each node in this example has a first child pointer 502, a second child pointer 504 and node data 506. The child pointers 502 and 504 can be set to null values where no child nodes exist. Both the main processor 224 of FIG. 2 and the traverse engines 234-240 of FIG. 2 have knowledge of the format of the data structure 500 of FIG. 5. The child pointers 502 and 504 can be specified as effective addresses within each node, where the traverse engines 234-240 can translate the effective addresses in nodes of the tree structure 400 of FIG. 4 to physical addresses.

Figure 6:
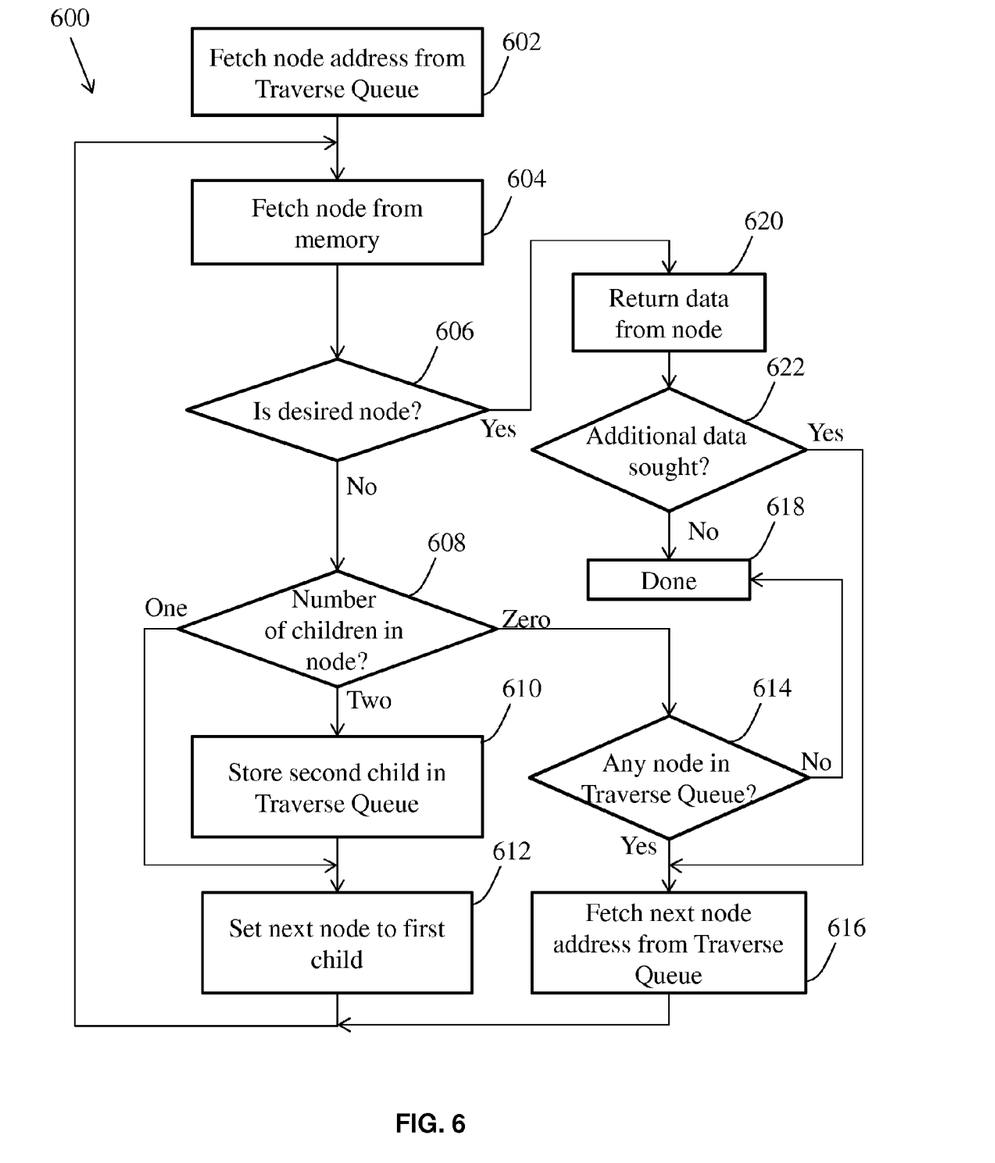
FIG. 6 illustrates a flow diagram of a process for tree traversal in a memory device in accordance with an embodiment.

FIG. 6 is a process 600 for tree traversal in a memory device. The memory device may be a three-dimensional memory cube with memory divided into three-dimensional blocked regions as memory vaults, such as the active memory devices of FIGS. 1-3 or a hybrid memory cube as previously described. The blocks depicted in FIG. 6 may be performed by one or more traverse engines as supported by a tree traverser or a processing element. It will also be understood that tree traversal can be implemented in other types of processing circuits and systems, and need not be limited to a specific memory device architecture.

A processor, such as main processor 224 of FIG. 2, provides a tree root pointer 402 of FIG. 4 indicating a root of the tree structure 400 of FIG. 4 to tree traverser 232 of FIG. 2, where tree traverser 232 is located within a memory device, such as one of the active memory devices 202-204 of FIG. 2.

The main processor 224 also provides an evaluation condition to the tree traverser 232 to identify a desired node of the tree structure 400. An evaluation condition can be in the form of an exact match, a relative comparison (e.g., greater than, less than), or other common tree searching criteria known in the art. The evaluation condition can also specify whether the exact results or summary results (e.g., a count or summation) should be returned as the data in the result buffer 114 of FIG. 1.

To support parallel tree traversal of the tree structure 400, the tree traverser 232 fetches a number of nodes of the tree structure 400 from the memory equal to a quantity of traverse engines being used for tree traversal. For example, if the tree traverser 232 is incorporated into memory device 204, traverse engines 234-236 of FIG. 2 can be used to traverse the tree structure 400 within the memory device 204. The tree traverser 232 stores the fetched nodes to the traverse queue 242 of FIG. 2 and initiates tree traversal according to the process 600.

At block 602, the tree traverser 232 fetches a node address from the traverse queue 242. When performing parallel traversal of the tree structure 400 across the traverse engines 234-236, each of the traverse engines 234-236 fetches an initial node address from the traverse queue 242 to start tree traversal and performs process 600 in parallel. The remainder of the process 600 is described in reference to traverse engine 234 and memory device 204.

At block 604, the traverse engine 234 fetches a node of the tree structure 400 from the memory of the memory device 204. At block 606, the traverse engine 234 compares data from the fetched node to determine whether it meets the evaluation condition and therefore is the desired node.

At block 608, based on determining that the fetched node is not the desired node, a check of the number of child nodes of the fetched node is performed. At block 610, based on determining that the fetched node has two or more child nodes, one or more of the child nodes is stored in the traverse queue 242. For example, if there are two child nodes, the second child node can be saved in the traverse queue 242 for later traversal. At block 612, the traverse engine 234 sets the next node for traversal to the first child node if the fetched node has one or more child nodes. The process 600 continues back to block 604 with fetching the next node from the memory of the memory device 204 by the traverse engine 234.

At block 608, if the fetched node has no child nodes, the traverse engine 234 checks to determine if there are any nodes in the traverse queue 242 at block 614. Based on determining that the traverse queue 242 includes at least one node, at block 616 the next address node is fetched from the traverse queue 242 and the process 600 continues back to block 604 with fetching the next node from the memory of the memory device 204 by the traverse engine 234. At block 614, based on determining that the traverse queue 242 does not include any nodes, the process 600 completes at block 618.

Returning to block 606, based on determining that the fetched node is the desired node, the data from the desired node meeting the evaluation condition is returned at block 620. At block 622, a check is performed to determine whether any additional data is sought from the tree structure 400. The determination can be based on the type of tree traversal originally requested, such as find first match vs. find all matches of the evaluation condition in combination with determining that a node exists in the traverse queue 242. If additional data is sought at block 622, the process 600 continues to block 616; otherwise, the process 600 completes at block 618.

Tree traversal continues until the tree structure 400 is fully traversed without identifying the desired node, or the desired node is identified and no additional data are sought. Returned data can be placed into the result buffer 114 of FIG. 1 for access by the main processor 224. A null value or pointer can be returned to indicate that no nodes matching the evaluation condition were identified.

Technical effects and benefits include tree traversal of a tree structure in a memory device. A tree traverser with traverse engines enables localized tree structure searching in the memory device to reduce data movement between a main processor and the memory device as well as to reduce impacts to cache memory.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for tree traversal in a memory device, the method comprising:
    receiving a pointer to a tree structure within memory of the memory device;
    receiving an evaluation condition to identify a desired node of the tree structure;
    traversing the tree structure to identify the desired node by a traverse engine within the memory device;
    returning data from the desired node meeting the evaluation condition;
    fetching a node of the tree structure from the memory of the memory device by the traverse engine, wherein returning the data from the desired node meeting the evaluation condition is based on determining that the fetched node is the desired node, where fetched node data meets the evaluation condition;
    based on determining that the fetched node is not the desired node and the fetched node comprises two or more child nodes setting a next node to one of the child nodes, storing one or more of the child nodes remaining to a traverse queue, and continuing with fetching the next node from the memory of the memory device by the traverse engine;
    based on determining that the fetched node is not the desired node and the fetched node comprises one child node, setting a next node to the one child node, and continuing with fetching the next node from the memory of the memory device by the traverse engine; and
    based on determining that the fetched node is not the desired node and the fetched node comprises no child nodes, fetching the next node from the traverse queue based on determining that the traverse queue includes at least one node, and continuing with fetching the next node from the memory of the memory device by the traverse engine.

2. The method of claim 1, further comprising:
    translating, within the memory device, effective addresses in nodes of the tree structure to physical addresses.

3. The method of claim 1, wherein the memory device is a three-dimensional memory cube with the memory divided into three-dimensional blocked regions as memory vaults.

4. The method of claim 1, wherein the pointer is a tree root pointer indicating a root of the tree structure received from a processor, and returning the data further comprises providing a result pointer indicating an address for the processor to access the data.

5. The method of claim 1, further comprising:
continuing with tree traversal until the tree structure is fully traversed without identifying the desired node, or the desired node is identified and no additional data are sought.

6. The method of claim 1, wherein the memory device further comprises a plurality of traverse engines, and further comprising:
fetching a number of nodes of the tree structure from the memory equal to a quantity of the plurality of traverse engines;
storing the number of fetched nodes to the traverse queue; and
initiating tree traversal of the tree structure in parallel across the plurality of traverse engines, wherein each of the plurality of traverse engines fetches an initial node address from the traverse queue to start tree traversal.

7. A memory device comprising:
memory;
a traverse queue; and
a tree traverser comprising a traverse engine within the memory device, the traverse engine configured to perform a method comprising:
receiving a pointer to a tree structure within the memory;
receiving an evaluation condition to identify a desired node of the tree structure;
traversing the tree structure to identify the desired node;
returning data from the desired node meeting the evaluation condition;
fetching a node of the tree structure from the memory, wherein returning the data from the desired node meeting the evaluation condition is based on determining that the fetched node is the desired node, where fetched node data meets the evaluation condition;
based on determining that the fetched node is not the desired node and the fetched node comprises two or more child nodes, setting a next node to one of the child nodes, storing one or more of the child nodes remaining to the traverse queue, and continuing with fetching the next node from the memory of the memory device by the traverse engine;
based on determining that the fetched node is not the desired node and the fetched node comprises one child node, setting a next node to the one child node, and continuing with fetching the next node from the memory; and
based on determining that the fetched node is not the desired node and the fetched node comprises no child nodes, fetching the next node from the traverse queue based on determining that the traverse queue includes at least one node, and continuing with fetching the next node from the memory.

8. The memory device of claim 7, wherein the memory device is configured translate effective addresses in nodes of the tree structure to physical addresses within the memory device.

9. The memory device of claim 7, wherein the memory device is a three-dimensional memory cube with the memory divided into three-dimensional blocked regions as memory vaults.

10. The memory device of claim 7, wherein the pointer is a tree root pointer indicating a root of the tree structure received from a processor, and returning the data further comprises providing a result pointer indicating an address for the processor to access the data.

11. The memory device of claim 7, wherein the tree traversal continues until the tree structure is fully traversed without identifying the desired node, or the desired node is identified and no additional data are sought.

12. The memory device of claim 7, wherein the memory device further comprises a plurality of traverse engines, and the tree traverser is further configured to perform:
fetching a number of nodes of the tree structure from the memory equal to a quantity of the plurality of traverse engines;
storing the number of fetched nodes to the traverse queue; and
initiating tree traversal of the tree structure in parallel across the plurality of traverse engines, wherein each of the plurality of traverse engines fetches an initial node address from the traverse queue to start tree traversal.

13. A system for memory device tree traversal, the system comprising:
a processor; and
a memory device comprising: memory, a traverse queue, and a traverse engine within the memory device, the traverse engine configured to perform a method comprising:
receiving a pointer to a tree structure within the memory from the processor;
receiving an evaluation condition to identify a desired node of the tree structure from the processor;
traversing the tree structure to identify the desired node;
returning data to the processor from the desired node meeting the evaluation condition;
fetching a node of the tree structure from the memory, wherein returning the data from the desired node meeting the evaluation condition is based on determining that the fetched node is the desired node, where fetched node data meets the evaluation condition;
based on determining that the fetched node is not the desired node and the fetched node comprises two or more child nodes, setting a next node to one of the child nodes, storing one or more of the child nodes remaining to the traverse queue, and continuing with fetching the next node from the memory of the memory device by the traverse engine;
based on determining that the fetched node is not the desired node and the fetched node comprises one child node, setting a next node to the one child node, and continuing with fetching the next node from the memory; and
based on determining that the fetched node is not the desired node and the fetched node comprises no child nodes, fetching the next node from the traverse queue based on determining that the traverse queue includes at least one node and continuing with fetching the next node from the memory.

14. The system of claim 13, wherein the memory device is configured translate effective addresses in nodes of the tree structure to physical addresses within the memory device.

15. The system of claim 13, wherein the memory device is a three-dimensional memory cube with the memory divided into three-dimensional blocked regions as memory vaults.

16. The system of claim 13, wherein the tree traversal continues until the tree structure is fully traversed without identifying the desired node, or the desired node is identified and no additional data are sought.

17. The system of claim 13, wherein the memory device further comprises a tree traverser including plurality of traverse engines, and the tree traverser is further configured to perform:
- fetching a number of nodes of the tree structure from the memory equal to a quantity of the plurality of traverse engines;
- storing the number of fetched nodes to the traverse queue; and
- initiating tree traversal of the tree structure in parallel across the plurality of traverse engines, wherein each of the plurality of traverse engines fetches an initial node address from the traverse queue to start tree traversal.

* * * * *